EQUIPMENT FAILURE ALARM SYSTEM FOR REPEATER STATION COMMUNICATION NETWORK
Filed July 15, 1954
3 Sheets-Sheet 1
Fig. I.
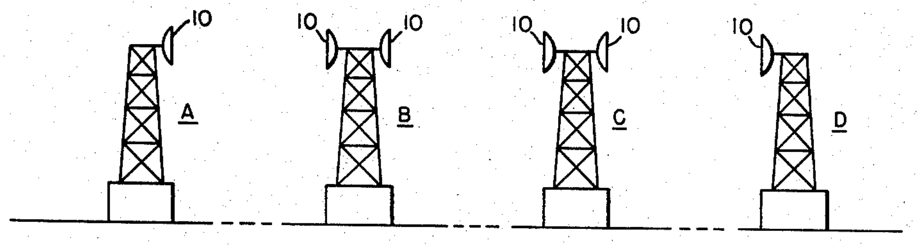
Fig. 2.
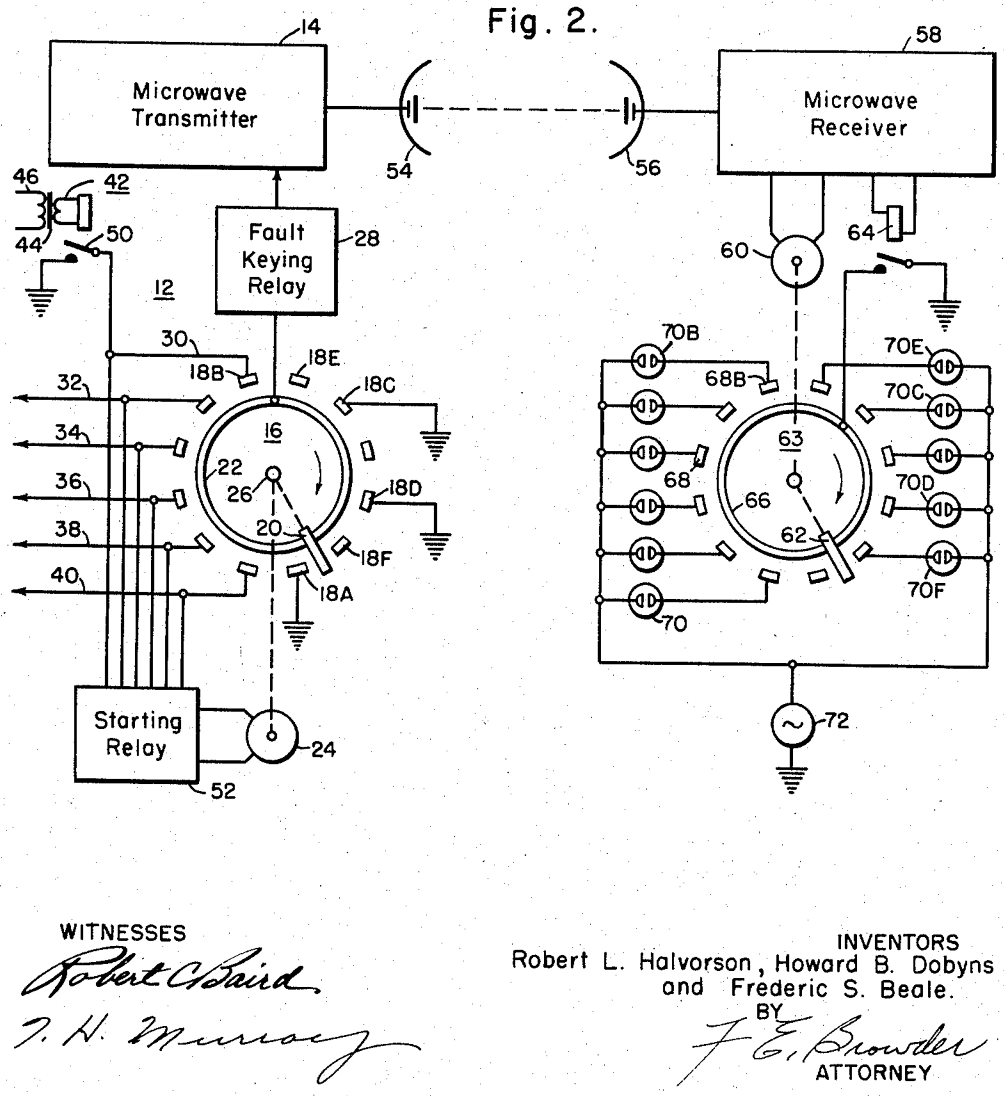
WITNESSES
Robert C. Baird
T. H. Murray
INVENTORS
Robert L. Halvorson, Howard B. Dobyns and Frederic S. Beale.
BY
F. E. Browder
ATTORNEY WITNESSES
Robert C. Baird
T. H. Murray INVENTORS
Robert L. Halvorson, Howard B. Dobyns
and Frederic S. Beale.
BY
F. E. Browder
ATTORNEY Feb. 24, 1959 R. L. HALVORSON ET AL 2,875,327

EQUIPMENT FAILURE ALARM SYSTEM FOR REPEATER STATION COMMUNICATION NETWORK

Filed July 15, 1954 3 Sheets-Sheet 3

United States Patent Office 2,875,327

Patented Feb. 24, 1959

2,875,327

EQUIPMENT FAILURE ALARM SYSTEM FOR REPEATER STATION COMMUNICATION NETWORK

Robert L. Halvorson, Baltimore, and Frederic S. Beale, Arbutus, Md., and Howard B. Dobyns, Bellflower, Calif., assignors to Westinghouse Electric Corporation, East Pittsburgh, Pa., a corporation of Pennsylvania Application July 15, 1954, Serial No. 443,622

12 Claims. (Cl. 250—6)

This invention relates to systems designed to give information regarding the operating conditions existing at different stations in a repeater station communication network.

In a point-to-point radio communication network, a series of spaced repeater stations are used for relaying signals over long distances. As will become apparent from the following description, each station in the network forms a link in a communication chain in which the various stations are adapted to receive signals from a preceding station and transmit corresponding signals to a succeeding station. Even though the reliability of the equipment located at each station in the network is sufficiently high to render its failure improbable, the possibility of occasional failures is always present. Hence, some means must be provided for detecting equipment failure and other off-normal conditions at each station. The repeater stations of the point-to-point network are often separated by distances of approximately thirty miles. It is impractical to have an attendant located at each of these stations to detect any off-normal conditions thereat; and, consequently, some of the stations will be left unattended. It, therefore, becomes desirable to have a means whereby the attendant at an attended station in the network may be readily appraised of one or more unattended stations at which an off-normal condition exists and the type of off-normal condition existing at that station or stations.

Accordingly, it is an object of this invention to provide a means for indicating at an attended station in a repeater station network (1) one or more unattended stations at which an off-normal condition may exist and (2) the type of off-normal condition existing at that station or stations.

Another object of the invention lies in the provision of means for effecting successive repetition of off-normal indications at an attended station at regular intervals during the time that an off-normal condition exists at an unattended station.

An important object of the invention is to provide means for preventing transmission of off-normal indications from two or more unattended stations at the same time. In this way confusion between simultaneous off-normal indications from two or more unattended stations is prevented.

A still further object of the invention lies in the provision of means which will report simultaneous off-normal conditions at two or more unattended repeater stations in succession so that each station will have a chance to report its off-normal condition to an attended station.

The novel features which we believe to be characteristic of our invention are set forth with particularity in the appended claims. The invention itself, however, both as to its organization and method of operation, together with further objects and advantages thereof, may best be understood by reference to the following description, taken in connection with the accompanying drawings which form a part of this specification and in which:

Figure 1 shows a point-to-point repeater station network in simplified form;

Fig. 2 is an illustration showing the general concept of the present invention;

Figure 3:
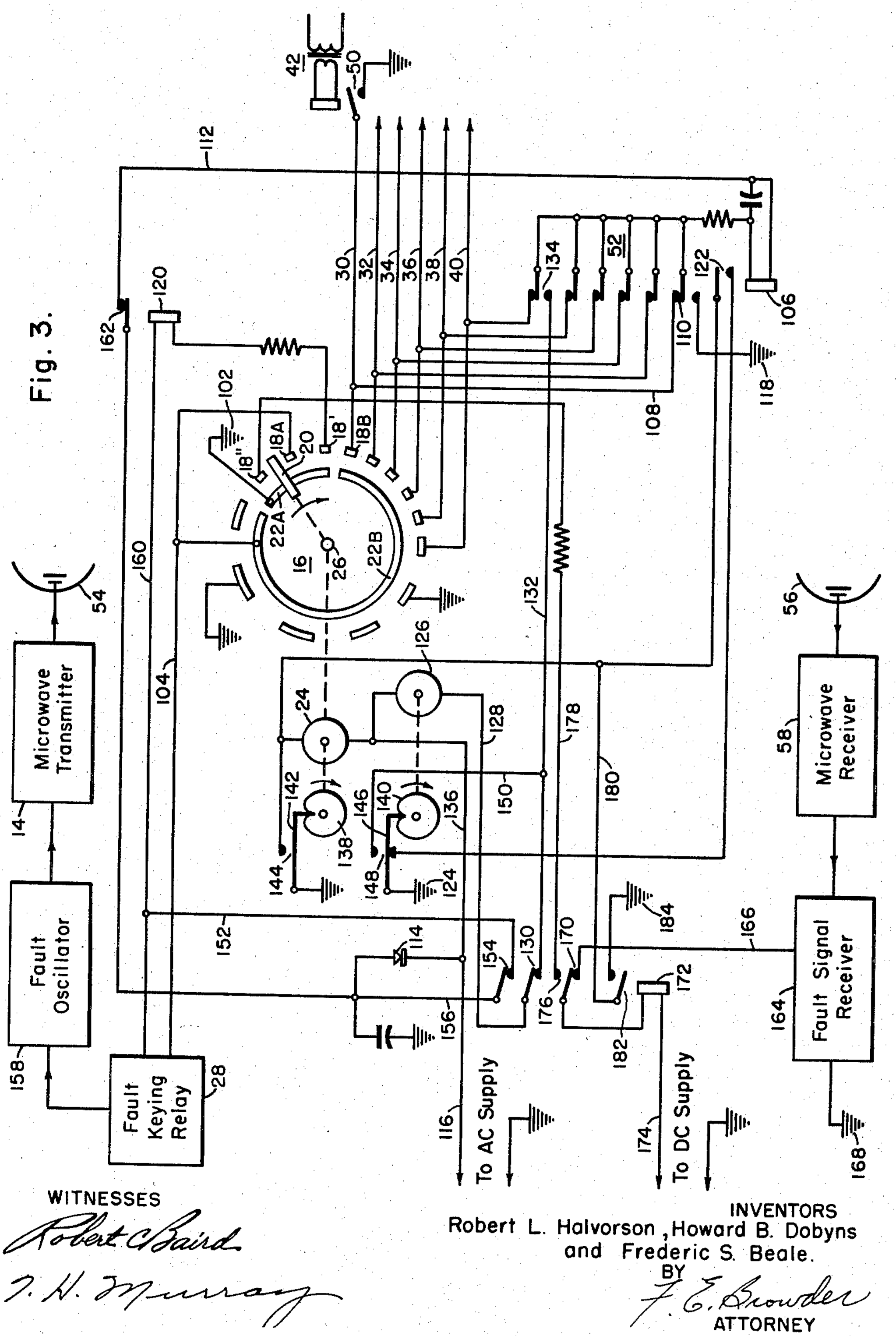
Fig. 3 is a schematic illustration showing the transmitting portion of the alarm system of the present invention.

In Fig. 1, the general scheme of a point-to-point communication network is illustrated. A plurality of repeater stations A, B, C and D are shown spaced apart at distances of approximately thirty miles. Each station is equipped with directional antennas 10 adapted to receive and transmit signals. The equipment located at each station is such as to receive signals from a preceding station and transmit corresponding signals to a succeeding station. For example, if a calling party at station A wishes to establish communication with another station in the network, he will actuate a transmitter at station A to send signals to station B. Station B will receive the signals from station A and will transmit corresponding signals to station C which will likewise transmit corresponding signals to station D. A party at station B, C or D can likewise establish communication with other stations in the network. Before voice communication is established, the calling party sends a preliminary signal which warns another party at some other station that someone in the network is attempting to establish communication with him. The called party will then lift a telephone receiver at his station and voice communication will be established. In this manner communication can be established between all the stations in the network. Although only four stations are disclosed in the present instance, it is obvious that the number of stations may be greatly increased.

GENERAL OVER-ALL DESCRIPTION OF THE ALARM SYSTEM

In actual practice, some of the stations in the network will be left unattended. Figure 2 discloses the general concept of the present invention for reporting equipment failures or other off-normal conditions at the unattended stations in the network to the attended station or stations. Located at each unattended station is an alarm circuit 12 which is adapted to actuate a fault signal oscillator and microwave transmitter 14 to generate a series of intermittent pulsed signals in response to an off-normal condition occurring at the station. Circuit 12 includes a circular circuit-making device 16 which has a plurality of contact points 18 circumferentially spaced about its outer periphery. A rotatable conducting member 20 spans the radial distance between a conducting ring 22 and the contact points 18. A motor 24 is connected to member 20 to rotate the same about center point 26. As member 20 rotates around point 26, a connection is made between the conducting ring 22 and each of the contact points 18 in succession.

The oscillator (not shown) of microwave transmitter 14 is normally rendered inoperative. However, whenever conducting ring 22 is grounded via one of the contact points 18, a fault keying relay 28 is energized to thereby actuate transmitter 14. It can thus be seen that as the member 20 rotates around point 26, transmitter 14 will be actuated to generate a pulsed signal whenever the member 20 makes contact with a grounded contact point 18. At least some of the contact points 18 are connected via leads 30, 32, 34, 36, 38 and 40 to fault sensing devices which sense equipment failures or other off-normal conditions at the unattended station. Off-normal conditions may, for example, be power failure, tower light failure, low emergency generator fuel, or the outbreak of fire. Obviously, if the power failure effects the entire unattended station, fault signals can be transmitted from that station only after a standby engine and generator replaces the loss of power to the transmitting equipment. Each of the fault sensing devices is such as to ground its associated contact point 18 when a fault occurs. Since various types of fault sensing devices are well known in the art, only one device 42 is shown in the present instance. The device 42 includes a transformer 44 having a primary winding 46 which may, for example, be included in a power circuit. Relay 42 is, therefore, energized when current passes through primary winding 46. If a power failure occurs relay 42 will be deenergized, and its associated contact point 18B will be grounded via lead 30 and contact points 50. Each of the fault sensing devices is connected to a starting relay 52 which will cause motor 24 to turn one revolution whenever one of the fault sensing leads (30, 32, 34, 36, 38, 40) is grounded. Member 20 is connected directly to motor 24; and, therefore, it turns one revolution also. The direction of rotation in the present embodiment is clockwise as shown by the indicating arrow. However, the direction of rotation is an arbitrary design choice, either direction being proper with appropriate changes in the design of device 16. As member 20 starts its revolution, it will first contact the permanently grounded contact point 18A. Therefore, a pulsed signal will be generated by transmitter 14 to be transmitted from antenna 54. This pulse will be received by antenna 56 at one of the attended stations in the network. The microwave receiver 58 at the attended station is such as to cause a second motor 60 to turn one revolution in synchronism with motor 24 upon receiving this first pulse. Motor 60 is connected to a second conducting member 62 in a second circular circuit-making device 63 at the attended station so that conducting members 20 and 62 turn one revolution in synchronism. As member 20 in the unattended station passes one or more contact points 18 which are grounded via their fault sensing devices, pulses will be sent from transmitter 14 to be received by receiver 58. Whenever a pulse is detected by the receiver, a relay 64 will be actuated to ground a conducting ring 66 at the attended station. Each of contact points 68 at the attended station is connected to one side of a corresponding neon lamp 70. The other sides of the neon lamps are connected to ground through a source of voltage 72.

Since conducting members 20 and 62 are traveling in the same direction and in synchronism during the interval of fault signal transmission, and since relay 64 will ground ring 66 when member 20 contacts a point 18 which is grounded by one of the fault sensing devices, it can readily be seen that a particular neon lamp circuit will be completed for each fault existing at the unattended station. Suppose, for example, that there is a power failure at the unattended station. Relay 42 will be deenergized and contact point 18B will be grounded. As conducting member 20 passes contact point 18B, a pulse will be sent from transmitter 14 to actuate relay 64 at receiver 58. At this instant, conducting member 62 will contact point 68B, and neon lamp 70B will be actuated.

Some of the contact points 18C, 18D at the unattended station are permanently grounded. Therefore, neon lamps 70C and 70D will also be energized as conducting member 62, during its one revolution, makes contact with their associated contact points. The permanently grounded contact points are used in this way to identify the station in the network at which a fault exists. That is, since lamps 70C and 70D were energized in the illustration given above, the attendant at the attended station would be apprised that the particular fault is occurring at the station in the network which has contacts 18C and 18D permanently grounded. If lamps 70E and 70F are energized, the attendant would know that another station, having contacts 18E and 18F permanently grounded, is reporting a fault.

In the actual detailed alarm circuitry hereinafter described, means are provided to keep the various neon lamps energized at the attended station until the fault or faults are removed at the unattended station. Other refinements are also included in the actual circuitry of the invention, it being the only purpose of Fig. 2 to give a general over-all picture of the invention.

*Detailed description of alarm transmitter*

Figure 4:
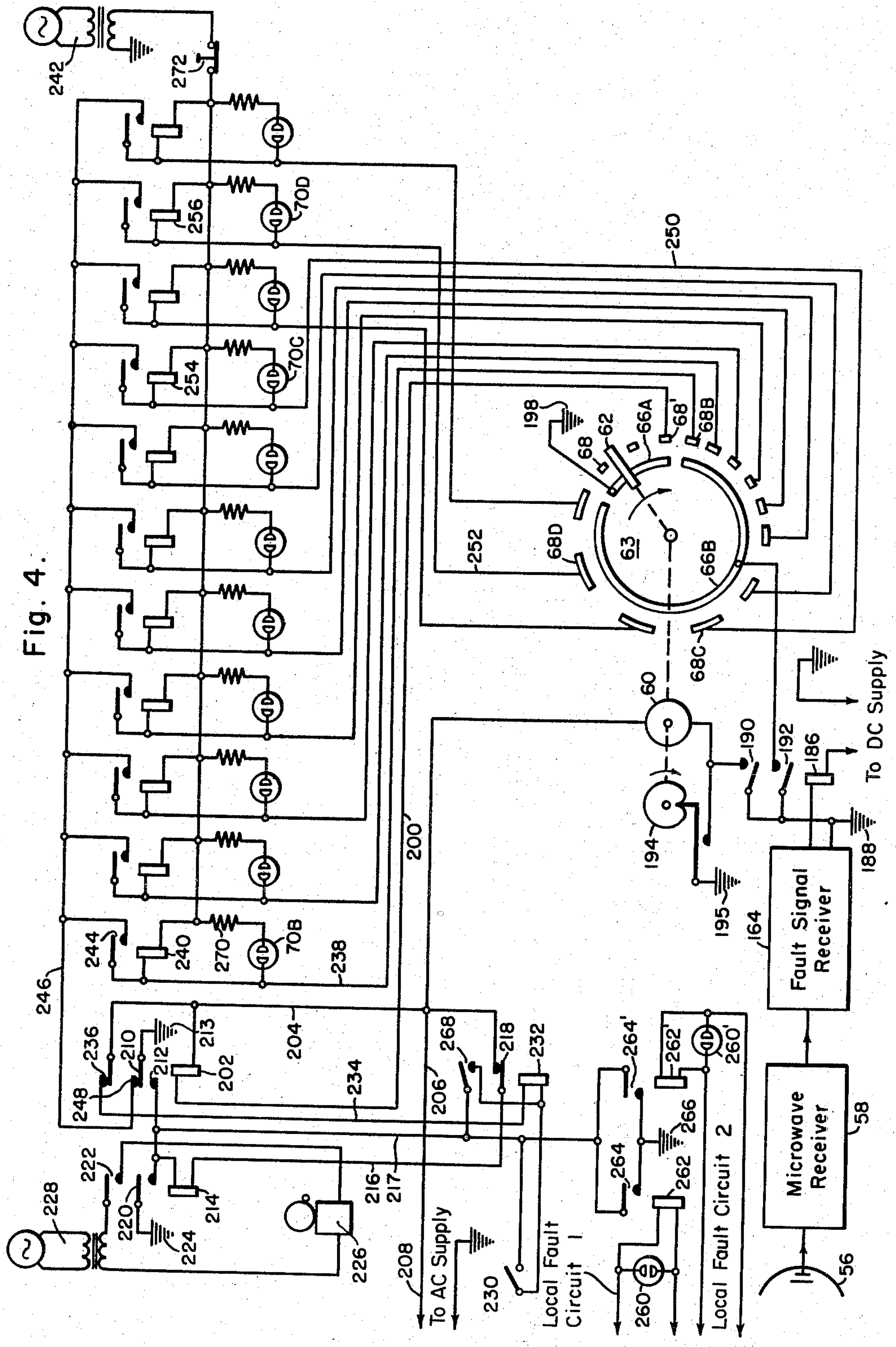
Fig. 4 is a schematic illustration showing the receiving portion of the alarm system of the present invention.

In Figs. 3 and 4, the actual detailed circuitry at the unattended and attended stations is shown. Elements shown in Figs. 3 and 4 which correspond to elements shown in Fig. 2 are designated by corresponding identification numerals. Turning first to Fig. 3 (the unattended station), it can be seen that in actual practice the conducting ring 22 is divided into two parts 22A and 22B. Part 22A is connected directly to ground at point 102, and part 22B is connected through path 104 to one side of fault keying relay 28. If a fault occurs, for example at sensing device 42, contacts 50 will close. A ground connection will, therefore, be provided for the solenoid 106 of starting relay 52 through path 30, path 108, and "make-before-break" contacts 110. The other side of solenoid 106 is connected via path 112 and rectifier 114 to a source of alternating current voltage at 116. Solenoid 106 will, therefore, be energized to pull all of the movable contact members of relay 52 downward. This action will permanently ground one side of solenoid 106 at point 118 through contacts 110 so that the relay 52 will remain energized until path 112 is broken by the action of relay 120. When relay 52 is energized, contact points 122 will close to thereby ground one side of one R. P. M. motor 24 at ground point 124. A second 1/15 R. P. M. motor 126 is also grounded by the action of relay 52. The ground path for motor 126 is through path 128, normally closed contact points 130, path 132, contact points 134 and 110, and ground point 118. The movable members of contact points 134 and 110 are now pulled downward because solenoid 106 is energized. The other sides of motors 24 and 126 are connected to the A. C. voltage source at 116 through path 136.

In view of the above description, it is apparent that when relay 52 is energized by grounding any one of the fault sensing devices, motors 24 and 126 will both begin to turn in a clockwise direction. Each motor is equipped with a cam 138, 140 which turns at a 1 to 1 ratio with respect to its associated motor. When cam 138 of motor 24 begins to turn clockwise, it immediately grounds one side of motor 24 via lever 142 and contact points 144. Cam 140 of motor 126 likewise grounds one side of its associated motor at 124 via lever 146 and contacts 148. The ground connection for motor 126 is now through path 150 and contacts 130, or through paths 150 and 132, contact points 134, contact points 110, and ground point 118. It can thus be seen that once the motors begin to turn, they will continue turning for at least one revolution since they are grounded by the action of their associated cams during that revolution. Motor 24, rotating at 1 R. P. M. will stop after one revolution. The ground connection at 124 which initiated movement of motor 24 is now broken by lever 146. After 15 minutes have elapsed, cam 140 will have completed one revolution (motor 126 rotates at 1/15 R. P. M.). Now, if a fault still exists at this station, one side of motor 24 will again be grounded at point 124, and the entire cycling process will start over again. In this way, motor 24 is adapted to rotate conducting member 20 of circuit-making device 16 one revolution every fifteen minutes. The length of time selected for this waiting period is arbitrary, and may be changed without affecting the invention as disclosed.

As conducting member 20 begins to rotate about center point 26, it first makes with contact point 18A.

One side of fault keying relay 28 is now grounded at 102. The other side of the fault relay is connected through path 152, contact points 154, path 156, and rectifier 114, to the source of A. C. voltage at 116. Fault keying relay 28 is thus energized to actuate fault oscillator 158. When actuated, fault oscillator 158 will generate an oscillatory signal modulated with 60-cycle voltage. The modulated oscillatory signal then serves as a modulating signal for the microwave carrier energy generated by microwave transmitter 14. For a full and detailed description of the fault oscillator, reference may be had to copending application Serial No. 438,393, filed June 22, 1954, and assigned to the assignee of the present application.

After making with contact point 18A, conducting member 20 will make contact with a second contact point 18' to ground one side of trip-out relay 120 at point 102. The other side of relay 120 is connected through path 160, path 152, contact points 154, path 156, and rectifier 114 to the A. C. voltage source at 116. Relay 120 is thus energized to open the path 112 at contact points 162. This action momentarily deenergizes the starting relay 52. If a fault remains at the station at this time, relay 52 will be immediately reenergized. However, if the fault has been removed when trip-out relay 120 is energized, starting relay 52 will stay deenergized, and motors 24 and 126 will come to rest after making one revolution since contact points 122 and 134 will then be separated.

After passing over contact point 18', conducting member 20 will make in succession with the remaining contact points of device 16 to cause a train of intermittent pulses to be sent from transmitter 14 in the manner described above. That is, a ground is provided for one side of fault keying relay 28 through path 104 and ring part 22B whenever member 20 makes with a grounded contact point.

Associated with microwave receiver 58 is a fault signal receiver 164 which serves to break the ground connection of path 166 at point 168 whenever a fault pulse is received from a distant unattended station in the network. Path 166 is connected through contact points 170 to one side of a solenoid 172, the other side of which is connected to a source of D. C. voltage at 174. Since path 166 is normally grounded, solenoid 172 will be energized in the absence of a received pulse from another station in the network. However, when a pulse is received, the ground connection of path 166 will be broken by fault signal receiver 164, and solenoid 172 will be deenergized. The connection effected by contact points 130 and 154 will, therefore, be broken; and one side of solenoid 172 will be connected to contact point 176 and path 178, instead of path 166.

When solenoid 172 is deenergized, as described above due to another station sending fault signals, the ground path of 1/15 R. P. M. motor 126 is broken by the separation of contact points 130. However, at the same time, motor 24 will be grounded through path 180, contact points 182 (which are closed when solenoid 172 is deenergized) and ground point 184. Motor 24 will, therefore, make one revolution. At the end of that revolution, conducting member 20 will make with contact point 18'' which is connected to path 178. It can be seen that a ground connection is now provided for solenoid 172 through contact point 176, path 178, point 18'', ring part 22A and ground point 102. Solenoid 172 will, therefore, be energized and will return its associated switches to their original position. Solenoid 172 is now grounded via contact point 170.

The purpose of solenoid 172 and its associated switches is to prevent simultaneous reporting of fault signals from two or more unattended stations in the system. It should be noted that when a fault pulse is received by receiver 58, motor 126 is stopped for one minute. Motor 24, however, is actuated; but as member 20 travels around device 16 during its one minute revolution, the station cannot transmit signals since all ground connections for fault relay 28 are then broken by virtue of the fact that contacts 154 are separated at this time. Therefore, a one minute interval in the cycling process is effected whenever a fault pulse is recevied from another station in the network. This is done in order to give other stations in the network a chance to report their faults to an attended station without interference. Since the 15 minute cycling time of motor 126 is automatically lengthened one minute as each station in the network reports its faults, it can be seen that any number of stations can report their faults over a single channel frequency in succession without interference. Obviously, the 15 minute period can be shortened to give more frequent reports, if desired, without loss of this feature.

*Detailed description of alarm receiver-indicator*

Turning now to Fig. 4, it can be seen that the circular circuit-making device 63 is identical in construction with the device 16 shown in Fig. 3. Network operation may require an alarm transmitter and an alarm receiver-indicator at a single station. However, it is normal for only one or perhaps two attended stations in the network to be equipped with both the alarm transmitter (Fig. 3) and the alarm receiver which registers complete visual display of network faults. When the alarm transmitter and receiver are both located at a single station, much of the equipment described in Figs. 3 and 4 may be combined to serve a dual function. For example, only one circuit making device may be used at the transmitter-receiver station instead of two separate devices as shown in Figs. 3 and 4. However, for purposes of the present application, the elements shown in Figs. 3 and 4 will be described separately in conjunction with the transmitter and receiver-indicator systems respectively.

When a fault occurs at one of the stations in the network, conducting member 20 (Fig. 3) will first contact point 18A to thereby cause a pulse to be transmitted to all other stations in the network. At the attended station shown in Fig. 4, this pulse will be detected by microwave receiver 58. Fault signal receiver 164 will then momentarily break the ground connection of a relay 186 at ground point 188. Contacts 190 and 192 are thereby momentarily closed. One R. P. M. motor 60 is now grounded via contact points 190 and ground point 188; and, thus, it begins to turn in a clockwise direction for one revolution in synchronism with motor 24. Cam 194 functions in the same manner as cam 138 in Fig. 3, and permits the motor 60 to complete one revolution regardless of the position of contacts 190. That is, after cam 194 begins to turn, motor 60 is grounded at point 195 until the motor completes one revolution. Conducting member 62 of device 63 will pass over successive contact points 68 in synchronism with conducting member 20 at a fault reporting station.

As conducting member 62 passes over contact point 68', a ground connection is provided for point 68' through ring part 66A and ground point 198. The ground connection leads through path 200 to one side of relay 202 which is thus momentarily energized. The other side of relay 202 is connected through paths 204 and 206 to a source of A. C. voltage at 208. Momentarily energization of relay 202 causes a movable contact member 210, which is connected to ground at 213, to contact point 212. Point 212 in turn leads to one side of relay 214. The other side of relay 214 is connected through path 216, contact points 218, and path 206, to the source of A. C. voltage at 208. Relay 214 is thus energized to close contacts 220 and 222. Closure of contacts 220 permanently grounds relay 214 at ground point 224. Thus, once relay 214 is closed by the action of relay 202 and members 210, 212, a holding circuit is effected which keeps relay 214 energized.

Closure of contacts 222 effects energization of a signal bell 226 which is equipped with a source of voltage 228. Hence, whenever conducting member 62 of device 63 contacts point 68', signal bell 226 is energized. This bell will continue to ring until switch 230 is momentarily closed by the attendant in the attended station. Momentary closure of switch 230 causes energization of relay 232 to thereby separate contact points 218. Since points 218 are included in the circuit of relay 214, the relay will become deenergized, and the circuit to signal bell 226 will be broken until another fault signal is received by the system. The energizing circuit for relay 232 is from ground point 224, through contact points 220, path 217, switch 230, path 234, contact points 236 (which are now closed because relay 202 is energized only momentarily), and paths 204 and 206 to the voltage source at 208.

At the attended station it is convenient to sound alarm bell 226 and energize certain lamps to indicate faults at the local station as distinct from those faults reported from remote stations. Accordingly, local fault lamps 260, 260' and relays 262, 262' may become energized from circuits, not shown, which are closed by fault sensing devices in response to the occurrence of local station faults. When contact points 264 or 264' of relays 262 and 262' close, they ground one side of relay 214 through path 217 and ground point 266. The other side of relay 214 is connected to the voltage source at 208 through contact points 218 and path 206, and, thus, relay 214 becomes energized to close contact points 222 and energize alarm bell 226. Contact points 264 or 264' remain closed as long as a fault persists at the local station. The bell 226 is silenced momentarily by closing the same switch 230 as is closed when releasing the bell after receiving a remote fault signal. Closure of switch 230 energizes relay 232 to thereby close contact points 268. This action grounds one side of relay 232 and permanently energizes the same until such time as contact points 264, 264' or 236 are opened. Contact points 264 and 264' will open when a local fault is removed, and contact points 236 will open whenever a fault signal is received from a remote station as described above. When relay 232 is thus energized by closing switch 230, contact points 218 open and interrupt the circuit to relay 214 thereby silencing the bell 226. Thus, ringing of the bell, initiated by either a remote or local fault signal, persists until action is taken by the operator in closing switch 230 to silence the audible indication.

If contact point 18B (Fig. 3) is grounded by fault sensing device 42 at the reporting station, a pulse will be generated by transmitter 14 at the instant conducting member 20 passes over contact point 18B. At this same instant, conducting member 62 at the attended station shown in Fig. 4 will make with contact point 68B. The pulse received by receiver 58 at this instant will close contacts 192, thereby grounding ring part 66B and contact point 68B. Point 68B is connected through path 238 to one side of relay 240. The other side of relay 240 is connected to a source of voltage 242. Therefore, relay 240 will be energized when member 62 passes over point 68B. Indicator lamp 70B and its current limiting resistor 270 are directly in parallel with the coil of relay 240; and, thus, both become energized simultaneously. Even though conducting member 62 is grounded via contact point 68B for only a moment, relay 240 and lamp 70B will remain energized. That is, a holding circuit to ground is effected for relay 240 and lamp 70B through contacts 244 (which are now closed), path 246, contact point 248 and ground point 213. If the fault reporting station has its contact points 18C and 18D permanently grounded, as they are in Fig. 2, a pulse will be received by receiver 58 in Fig. 4 when conducting member 62 is on contact points 68C and 68D, respectively. These contact points are connected via leads 250 and 252 to relays 254 and 256. Therefore, neon lamps 70C and 70D will be energized in the same manner as lamp 70B. By viewing the series of lamps at the attended station, the attendant now knows that a power failure has occurred at the station in the network having contacts 18C and 18D permanently grounded. The lamp display may be extinguished after apprisal by the operator by momentarily opening switch 272, or the display may remain until automatically extinguished by the next fault report.

As member 62 travels around device 63 again in response to another fault in the system, it will make contact with point 68' to thereby energize alarm bell 226. The bell is silenced again by momentarily closing switch 230, as explained above, for remote faults or local faults. As member 62 contacts point 68', relay 202 is energized and the ground connection of all the lamps in the system is thereby broken at contact point 248. Relays 240, 254 and 256 will, therefore, open their associated contact points, and the neon lamps will be extinguished and made ready to provide either a redisplay of the same indication, or the display of any new indication, either from the same station or from any other station in the network.

It can thus be seen that the present invention provides a means for indicating the existence of a certain type of faulty or off-normal condition at a particular station in a point-to-point communication network by a visual display of lamps at an attended station. Although the invention has been described in connection with a radio communication network in particular and also in connection with a certain specific embodiment, will be understood by those skilled in the art that the invention can be used with other and different types of communication systems and that various changes in form and arrangement of parts can be made without departing from the spirit and scope thereof.

We claim as our invention:

1. In a communication system of the type having a number of spaced repeater stations, means, for reporting off-normal conditions at a plurality of apparatus units at each of said stations and comprising normally inoperative transmitting means located at each of said stations, a circuit associated with each of said stations for automatically actuating said transmitting means to radiate a distinct signal in response to an off-normal condition occurring at one or more of said apparatus units, said signal comprising a train of pulsed signals separated by unequal time intervals, the number of time position of the pulses in said train being such as to identify the apparatus unit or units which are off-normal and the station from which the signal is sent, a timing device located at each of said stations and adapted to actuate said transmitting means to repeat radiation of said distinct signal after a predetermined amount of time, receiving means for detecting said signals, and means associated with said receiving means and responsive to received signals from said transmitting means for indicating an apparatus unit or units which are off-normal and the station at which said off-normal conditions exist, and a device at each of said stations responsive to said distinct signal from any of the other stations in said system for rendering the transmitting means at that station inoperative during transmission of said distinct signal by said other station.

2. In a radio communication system of the type having a number of spaced repeater stations, means for reporting off-normal conditions at a plurality of apparatus units at each of said stations and comprising normally inoperative transmitting means located at each of said stations, a circuit located at each station for automatically actuating said transmitting means to radiate a distinct signal in response to an off-normal condition occurring in one or more of said apparatus units, said signal comprising a train of three or more pulsed signals separated by unequal time intervals, the number and time position of the pulses in said train being such as to identify both the apparatus unit or units which are off-normal and the station from which the pulses are sent, receiving means for detecting said train of pulses, and means responsive to a received train of pulses for indicating the apparatus unit or units which are off-normal and the station at which said off-normal conditions exist, and a device at each of said stations responsive to said distinct signal from any of the other stations in said system for rendering the transmitting means at that station inoperative during transmission of said distinct signal by said other station.

3. The combination claimed in claim 2 wherein means responsive to a train of pulsed signals transmitted from one of said stations in said system are provided for rendering the transmitting means of all other stations in the system inoperative during transmission of the pulse train from said one station.

4. The combination claimed in claim 2 wherein the transmitting actuating means includes a plurality of normally open parallel circuits each of which is adapted to render said transmitter operative when closed, a step-by-step circuit closing device associated with said parallel circuits and adapted to close said circuits in succession, and closing device comprising a plurality of contact points circumferentially spaced about a common center point, each of said contact points being included in one of said parallel circuits, a conducting member rotatable about said center point for contacting each of said points in succession, and normally open switches included in some of said parallel circuits, each of said switches being closed in response to the existence of an off-normal condition at an associated apparatus unit.

5. The combination claimed in claim 2 wherein the indicating means includes a plurality of indicator lamps, said indicating means being such that when an indicating train of pulsed signals is received from one of said stations in the system, a particular combination of indicator lamps will be energized to indicate the station from which the pulses are received and the particular apparatus unit which is off-normal at said station.

6. In a communication system, a normally inoperative transmitter, a receiver located at a distant point with respect to said transmitter, a communication channel interconnecting said transmitter and receiver, a relay for actuating said transmitter, a plurality of normally open circuits each of which is adapted when closed to energize said relay and actuate said transmitter, a first step-by-step circuit closing device associated with said transmitter and adapted to successively close said circuits, said closing device comprising a plurality of spaced contact points circumferentially spaced about a common center point, each of said contact points being included in one of said parallel circuits, a conducting member rotatable about said center point for contacting each of said contact points in succession, a connection between said rotatable conducting member and said relay, normally open switches in at least some of said parallel circuits, said switches being closed in response to certain predetermined conditions which may exist at said transmitter, a prime mover for rotating said conducting member, a switch device operated by a cam driven by said prime mover for permitting the prime mover to rotate said conducting member one revolution in response to closure of any one of said switches, a plurality of devices associated with said receiver for indicating off-normal conditions at said transmitter, a second step-by-step circuit closing device for actuating said indicating devices at said receiver, said second device also including a plurality of contact points circumferentially spaced about a center point at the same radial distance and in the same circumferential spacing relationship as the contact points of said first closing device, a conducting member rotatable about the center of said second device for contacting said points in succession, a connection from said contact points to said indicating devices, a prime mover for said second closing device, the relationship between said first and second closing devices being such that upon initial movement of the conducting member of the first closing device a signal will be sent from said transmitter to said receiver to thereby cause one revolution of the conducting member of the second closing device in synchronism with the conducting member of said first device, and means responsive to received signals from said transmitter for energizing one or more of said indicating devices as the conducting member of said second closing device travels its one revolution whereby the indicating devices will indicate the existence of said predetermined conditions at said transmitter.

7. In a communication system, a normally inoperative transmitter, a receiver located at a distant point with respect to said transmitter, a communication channel interconnecting said transmitter and receiver, a plurality of normally open circuits each of which is adapted when closed to actuate said transmitter, a first step-by-step circuit closing device associated with said transmitter and adapted to successively close said circuits, normally open switches in at least some of said parallel circuits, said switches being closed in response to certain predetermined conditions which may exist at said transmitter, a timing device adapted to cause said step-by-step circuit closing device to again close said circuits in succession after a predetermined amount of time, a plurality of devices associated with said receiver for indicating the existence of off-normal conditions at said transmitter, a second step-by-step circuit closing device for actuating said indicating devices at said receiver, the relationship between said first and second closing devices being such that upon initial closure of one of said parallel circuits at said transmitter by said first closing device a signal will be sent from said transmitter to said receiver to thereby cause actuation of the second closing device, and means associated with said second closing device and responsive to received signals from said transmitter for energizing certain of said indicating devices which will identify the existence of a particular predetermined condition at said transmitter.

8. The combination claimed in claim 7 wherein a plurality of transmitters are adapted to send signals to said receiver to indicate the existence of certain predetermined conditions at said transmitters.

9. The combination claimed in claim 7 wherein a plurality of transmitters are adapted to send signals to said receiver to indicate the existence of certain predetermined conditions at said transmitters, and means associated with said receiving means for identifying the transmitter from which signals are received.

10. In a communication system of the type having a number of spaced repeater stations, means for reporting off-normal conditions at a plurality of apparatus units at each of said stations and comprising a plurality of off-normal sensing devices at each of said stations, means associated with said sensing devices at each of said stations for transmitting a pulsed signal for each off-normal condition which exists thereat, receiving means for detecting signals from said transmitting means, means associated with said transmitting means for generating an initial pulsed signal in response to the existence of an off-normal condition, apparatus located at each of said stations and adapted to cause said transmitting means to repeat transmission of said train of pulsed signals after a predetermined amount of time, and a device associated with said receiving means for indicating the existence of off-normal conditions at one or more stations in the system, said device being conditioned to indicate the existence of off-normal conditions only when the receiving means detects said initial pulse from said transmitting means.

11. The system described in claim 10 wherein each station generates one or more pulsed signals which identify the station from which the pulses are sent, and means included in said indicating device and responsive to the signals which identify a station for indicating the station from which the pulses are sent.

12. The system claimed in claim 10 wherein means are provided for rendering the transmitting means at all but one of said stations inoperative while the said one station is transmitting pulsed signals.

References Cited in the file of this patent

UNITED STATES PATENTS

| | | |
|---|---|---|
| 1,533,171 | Dowd | Apr. 14, 1925 |
| 1,874,664 | Vernam | Aug. 30, 1932 |
| 2,524,861 | Wallace et al. | Oct. 10, 1950 |
| 2,567,226 | McWhirter et al. | Sept. 11, 1951 |
| 2,734,131 | Magnuski | Feb. 7, 1956 |